Aug. 19, 1924.
C. BEDELL
1,505,186
ANIMAL CRATE AND HOLDER
Filed Oct. 23, 1923
3 Sheets-Sheet 1
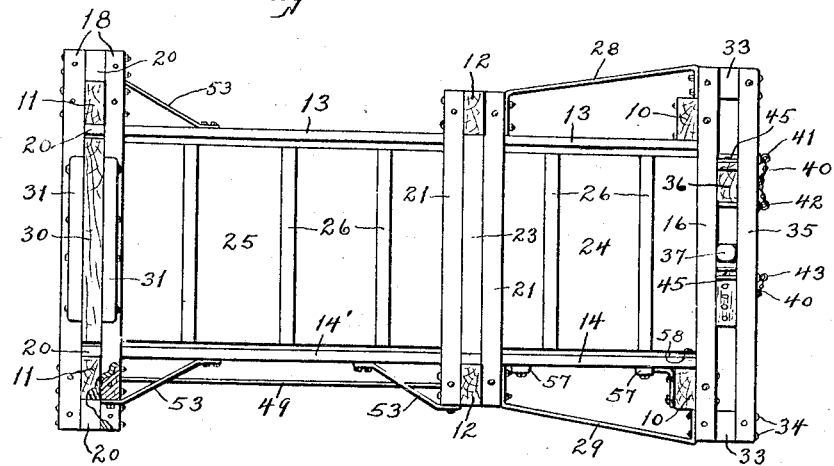
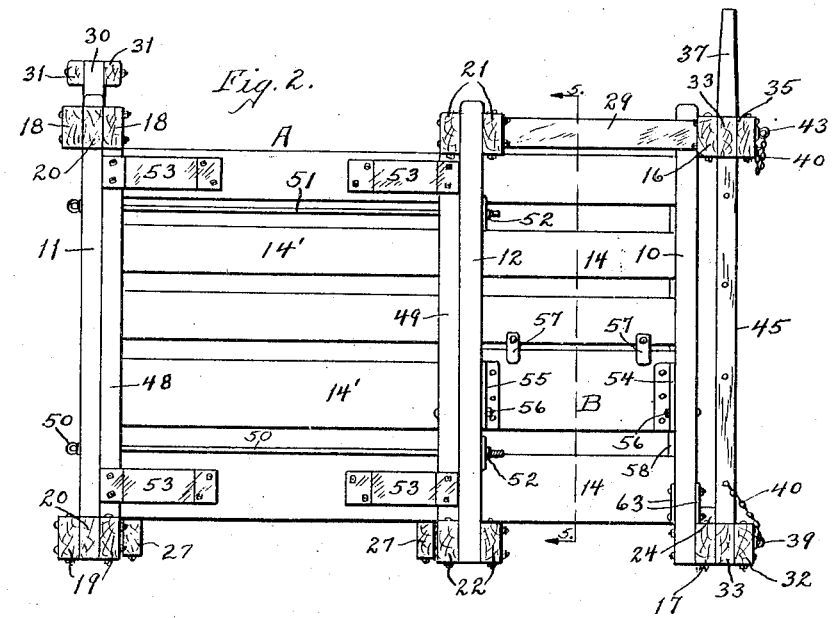
Inventor
CHAS. BEDELL
by Earl M. Sinclair Atty.

Aug. 19, 1924.
C. BEDELL
1,505,186
ANIMAL CRATE AND HOLDER
Filed Oct. 23, 1923   3 Sheets-Sheet 2
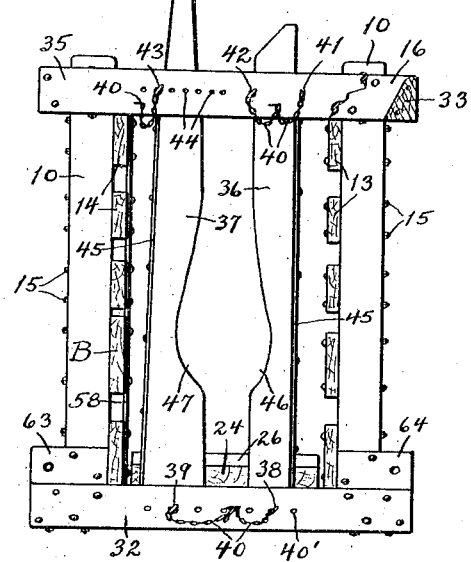
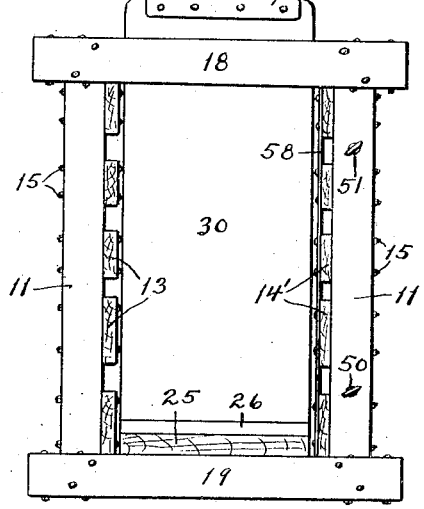
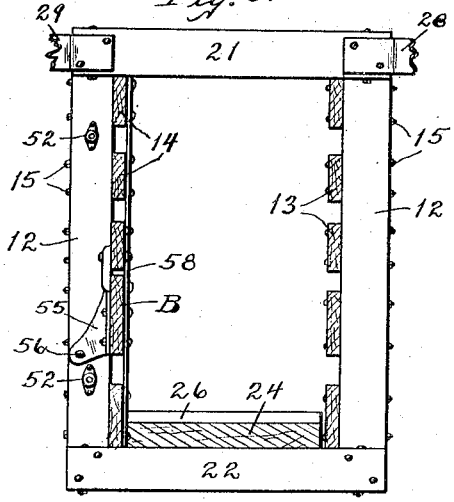
Inventor
CHAS. BEDELL
by Earl M. Sinclair Atty.

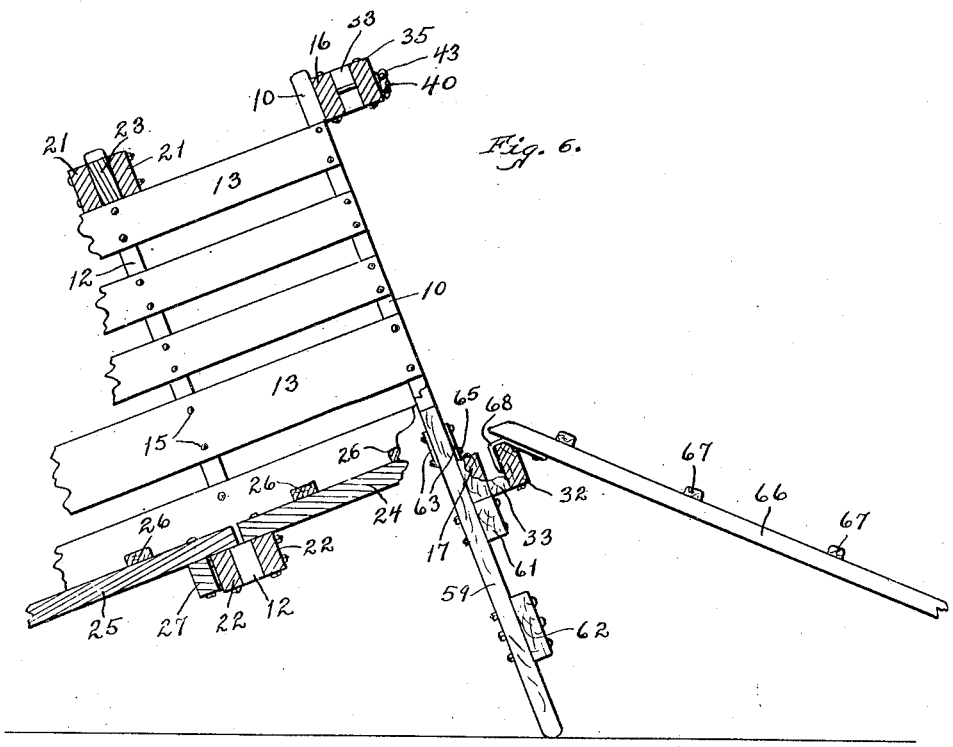
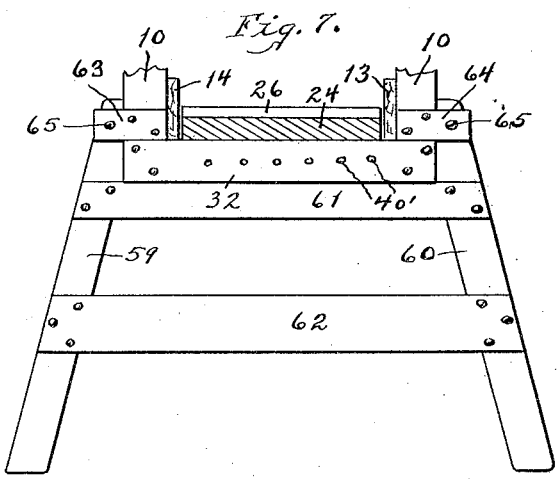

Patented Aug. 19, 1924.

1,505,186

UNITED STATES PATENT OFFICE.

CHARLES BEDELL, OF GLIDDEN, IOWA.

ANIMAL CRATE AND HOLDER.

Application filed October 23, 1923. Serial No. 670,270.

*To all whom it may concern:*

Be it known that I, CHARLES BEDELL, a citizen of the United States of America, and resident of Glidden, Carroll County, Iowa, have invented a new and useful Animal Crate and Holder, of which the following is a specification.

An object of this invention is to provide an improved construction for an animal crate and holder which is adaptable for use in a variety of ways and for treating and performing different operations upon different animals, such as hogs and calves.

A further object of this invention is to provide an improved crate and holder adapted for receiving and holding an animal such as a hog, holding the animal's head stationary so it cannot be moved up or down and facilitating such operations as ringing or the administration of medicine internally.

A further object of this invention is to provide a hog and calf crate which can be converted readily so that the holding device is adapted for use on either of such animals as occasion may require.

A further object of this invention is to provide an improved animal crate and holder adapted for use in confining and holding a hog or calf while castrating, ringing or vaccinating, and capable of being turned or opened in various ways to permit access to such portion of the animal's body as is required for the particular operation in hand.

A further object of this invention is to provide an improved crate and holder with a trestle attachment for elevating one end thereof at times to facilitate the administration of medicine internally.

A further object of this invention is to provide a device of the character indicated which is simple and economical in construction, substantial, easily repaired, readily adaptable to different uses, and efficient for the purposes for which it is designed.

My invention consists in the construction, arrangement and combination of elements hereinafter set forth, pointed out in my claims and illustrated by the accompanying drawings, in which—

Figure 1 is a plan view of the device and Figure 2 a side elevation of the same. Figure 3 is a front end elevation of the same, showing the holding devices adjusted for use on a hog. Figure 4 is a rear end elevation. Figure 5 is a cross-section on the line 5—5 of Figure 2. Figure 6 is a longitudinal section of the front end portion of the device, showing it elevated by means of the trestle attachment for use in administering medicine to an animal in the crate. Figure 7 is a front elevation, partly in section, of a portion of the devices shown in Figure 6.

In the construction of the device as shown I employ front corner posts 10, rear corner posts 11 and intermediate posts 12, appropriately spaced in pairs and connected longitudinally by rails or slats 13, 14 mounted against their inner faces and secured as by bolts 15. The front posts 10 are connected transversely by an upper cross-bar 16 and a lower cross-bar 17, mounted against their forward faces, and projecting at their ends beyond said posts. The rear posts 11 are connected transversely by a pair of upper cross-bars 18 and a pair of lower cross-bars 19, mounted against their forward and rear faces and projecting at their ends beyond said posts; blocks 20 being mounted between the projecting ends of said cross-bars against the outer faces of said posts, and also between said cross-bars against the inner faces of said posts, and all securely bolted to form a rigid structure. Cross-bars 21 are mounted on opposite sides of the upper ends of the intermediate posts 12, and lower cross-bars 22 on opposite sides of the lower ends thereof; said cross-bars 21, 22 preferably ending flush with the outer faces of said posts and being securely bolted thereto. A filler bar 23 also is mounted between the intermediate posts 12 and fills the space between them and the spaced cross-bars 21, 22. A rigid floor section 24 is mounted on and secured to the lower cross-bars 17—22 and a removable floor section 25 is mounted loosely on the cross-bars 19—22; the joint between said floor sections coming between the two intermediate cross-bars 22, and the two sections cooperating to form a floor for the crate, extending from the front posts 10 to the rear posts 11 between the lowermost rails or slats 13, 14. The floor sections 24, 25 preferably are of somewhat less width than the space between the rails or slats 13, 14, so that dirt, trash, water and the like may escape between said floor sections and the lowermost rails or slats. The floor sections 24, 25 preferably are provided with cleats 26 transversely of their upper faces at spaced intervals, to make it easier for an animal to walk thereon when the crate is in inclined position. The removable section 25 is provided with transverse cleats 27 on its lower face and somewhat spaced from its ends, adapted to fit within the cross-bars 19 and 22.

Metal braces 28, 29 are fixed to projecting end portions of the upper forward cross-brace 16, extend rearwardly therefrom and are fixed at their opposite ends to projecting end portions of the foremost of the intermediate upper cross-bars 21.

An endgate 30 is provided and is adapted for vertical sliding movement between the upper rear cross-bars 18, the lower end portion of said endgate being adapted to rest on the rear portion of the removable floor section 25, between transverse cleats 26 thereof. When closed the upper end of the endgate 30 projects above the cross-bars 18, and it is provided at its upper end with handle cleats 31 for ease and safety in manipulation.

A lower guide bar 32 is mounted in spaced relation parallel with and forwardly of the lowermost front cross-bar 17, being spaced therefrom by blocks 33 at the ends of said bars, bolts 34 passing through said bars and blocks. Similarly an upper guide bar 35 is mounted in spaced relation parallel with and forwardly of the uppermost front cross-bar 16. Holding bars 36, 37 are mounted in substantially vertical position between the bars 17—32 and 16—35 and are adapted partially to close the forward end of the crate. The holding bars 36, 37 are adjustably and pivotally connected at their lower ends to and between the bars 17—32, by means of pins or bolts 38, 39 respectively, passing selectively through one of a series of holes 40' formed in registration through said bars. The pins 38, 39 are removable for adjusting the spacing of the lower ends of the holding bars 36, 37, and preferably are secured to the frame by means of small chains 40 to prevent loss. The holding bar 36 is designed normally to remain in substantially vertical position, and it is held in such position by means of pins 41, 42 passing through holes in the upper bars 16—35, on opposite sides of said holding bar, said pins also being provided with retaining chains 40. The holding bar 37 projects a considerable distance above the bars 16—35 and is tapered to form a handle by means of which it may be manipulated. Its upper end is adapted to be held in adjusted relation with respect to the holding bar 36 by means of a pin 43 passing through selected ones of registering holes 44 in the bars 16—35, and engaging the outer face of said bar. One margin of each holding bar 36, 37 is plane and straight, and said margins are reinforced by metal strips 45. The opposite margins of said holding bars are notched on curved lines at 46, 47 respectively, the curves at the lower ends of said notches preferably being more abrupt than at the upper ends as shown in Figure 3, thus fitting said bars to embrace the head and neck of a hog in the crate with his head projecting between said holding bars and preventing up and down movement of the animal's head as well as lateral movement. Either or both of the holding bars may be adjusted at their lower ends to fit the size of the animal to be held, and the swinging bar 37 also may be adjusted at its upper end by selective engagement of the pin 43 in the holes 44. When a calf is confined in the crate the holding bars 36, 37 may be removed and reversed, the plane faces being then opposed to each other and the bars acting as stanchions to hold the animal.

A portion of one side of the crate is made removable, such portion being designated by the letter A. The rails or slats at this side of the crate are cut into two sections, 14, 14', abutting in the vertical plane of the intermediate post 12, the rear sections 14' being disconnected from said post and fastened together, at their front and rear ends, by vertical bars 48, 49 lying against opposed faces of the posts 11, 12 respectively when the removable section A is in place. The removable section A is adapted to be held in place in the crate by means of rods 50, 51 passing through the rear post 11, vertical bars 48, 49 and intermediate post 12, threaded on their ends and secured by nuts 52.

The rear end of the crate is provided with inclined metallic braces 53 connecting rear end portions of the uppermost rails or slats 13 and 14' to their posts; in the one instance the rails 13 to the rear post 11; and in the other instance the rails 14' of the removable section, at both ends, to the vertical bars 48 and 49.

The crate also is provided at its lower forward end with a hinged door B, formed by cutting out a portion of a rail or slat 14 between the front post 10 and intermediate post 12 and affixing to such section, or door B, a pair of angular hinges 54, 55, pivoted on a longitudinal line near the lower margin of said door, by means of bolts 56 or similar members, to opposed faces of said posts 10 and 12. Thus the door B is adapted to swing outwardly and downwardly from the plane of the side of the crate, permitting access to the lower portion of the forward end thereof for certain operations, such as vaccinating an animal on a fore limb or shoulder. The door B normally is held in closed position by means of one or more buttons 57 pivoted on an adjacent slat or rail and adapted to overlap the door B;

and a stop such as 58 is fixed to the inner faces of adjacent slats or rails 14 and projects beyond the margin of the door B, to limit inward movement of the door.

A trestle is provided for elevating the forward end of the crate at times as shown in Figures 6 and 7. The trestle is composed of legs 59, 60 divergently arranged and connected by spaced bars 61, 62. The upper ends of the legs 59, 60 project above the upper bar 61 and are adapted to embrace the forward end of the crate just behind the lower front cross-bar 17 and are tapered on vertical lines for snug fitting against the outer faces of the front posts 10. Brackets 63, 64 are fixed to and project outwardly from lower end portions of the front legs 10, each bracket being composed of parallel straps mounted on opposite sides of the leg, and upper end portions of the legs 59, 60 of the trestle are adapted to be received within the respective brackets 63, 64 and be secured by means of bolts 65. When so mounted the front end of the crate is elevated and the trestle is inclined forwardly, in the same plane as the front legs 10, the legs 59, 60 diverging outwardly in said plane and being braced by contact with the projecting ends of the lower cross-bar 17, so that a stable relation is established. When the crate is thus elevated it is adapted for use in holding a hog while worm medicine is being administered to him, or the like, and danger in giving the medicine is avoided because the operator can look into his throat and see that the medicine does not go into the animal's windpipe; the animal's head is held stationary by the notched holding bars, which do not interfere with his swallowing the medicine. After the animal is released he may walk out of the crate on an inclined runway 66, having cleats 67, and a hook 68 at one end by which it may be supported from a cross-bar of the crate or trestle as shown in Figure 6.

The device may be used as a loading chute by removing the endgate and holding devices and supporting one end on a vehicle to which the animals are to be loaded. It may be used as a transportation crate by confining an animal therein by means of the endgate and holding devices (which may be used to engage the animal's neck or simply to close the front end of the crate) and loading it on a vehicle. It may be used to confine and hold hogs for ringing, castrating, vaccinating or administering medicine. It may be used to confine and hold calves for vaccinating or dehorning.

For ringing or marking hogs the crate stands flat on the ground or floor. The animal is driven into the crate and his head secured in the holding devices, and after the operation is completed the animal is released by drawing the pin 43 and pivoting the holding bar 37. To vaccinate a hog secure him in the same way and open the small door B, which gives access to the fore quarters of the animal, the operator's hands and arms being inserted through the opening. If the animal is to be vaccinated behind the ear it may be done from in front the same as the ringing operation. For castrating an animal he is secured in the crate and holding devices and then the removable section A of the side of the crate is taken out by removing the rods 49, 50. Then the hog's rear legs are tied to the frame and the crate is turned on one side and the removable section 25 of the floor taken out, giving easy access to the animal while he is securely held.

It will be observed that the device is strong and handy and is easily transformed and converted or adapted for the different uses referred to. Animals, either hogs or calves are held and confined in the special manner needed for each of the operations or treatments, without danger of their injuring themselves or the operator. The principal parts are made of wood so that in case of any breakage the owner can easily replace or repair them, and these wooden parts are well bolted and braced. The double construction of cross-bars of the frame lends stability and strength.

I claim as my invention—

1. An animal crate and holder, comprising posts spaced apart in pairs, cross-bars connecting upper and lower ends of said posts transversely in pairs, slats connecting said posts longitudinally, a floor mounted on the lower cross-bars, said floor being formed in two sections, one of which is loosely mounted on certain of said cross-bars and is removable, and means for closing the ends of said crate.

2. An animal crate and holder, comprising posts spaced apart in pairs, cross-bars connecting upper and lower ends of said posts transversely in pairs, slats connecting said posts longitudinally, a door formed by severing a relatively short portion of one of said slats and hinging it for outward swinging movement between two of said posts, a portion of one side of said crate being formed of slats connected by vertical bars and such portion being removably secured between certain of said posts, a floor carried by the lower cross-bars, and means for closing the ends of said crate.

3. An animal crate and holder, comprising an enclosure having spaced posts at its forward end, a cross-bar connecting the lower ends of said posts, brackets fixed to and projecting laterally from said posts, and a separate and unitary trestle formed of spaced legs and cross-bars rigidly connecting said legs, the upper ends of said legs being adapted to be attached to said brackets whereby the forward end of said enclosure may be elevated.

4. An animal crate and holder, comprising an enclosure having spaced posts at its forward end, a cross-bar connecting the lower ends of said posts, brackets fixed to and projecting laterally from said posts, and a trestle formed of spaced, divergent legs and cross-bars rigidly connecting said legs, the upper ends of said legs projecting above the uppermost cross-bar of the trestle and adapted to embrace the lower ends of said posts and be secured to said brackets.

5. An animal crate and holder, comprising spaced posts, cross-bars connecting upper and lower ends of said posts transversely, slats connecting the posts at one side of the crate longitudinally, and a removable section on the opposite side of said crate formed of slats connected by vertical bars, said bars being adapted to be mounted within the space between certain posts, and rods extending through said posts and bars.

6. An animal crate and holder, comprising spaced posts, cross-bars connecting upper and lower ends of said posts transversely, slats connecting said posts longitudinally, a rigid floor section carried by the forward and intermediate lower cross-bars, and a removable floor section loosely mounted on the intermediate and rearmost lower cross-bars, said removable floor section being provided with transverse cleats on its lower face adapted to engage opposed faces of the last named cross-bars.

Signed at Ralston, in the county of Carroll and State of Iowa, this 24th day of September, 1923.

CHARLES BEDELL.